United States Patent
Yueh

(10) Patent No.: US 7,162,277 B2
(45) Date of Patent: Jan. 9, 2007

(54) WIRELESS EARPHONE WITH BUILT-IN MOBILE COMMUNICATIONS MODULE AND DIAL-UP METHOD OF THE SAME

(75) Inventor: Wen Hsiang Yueh, Hsin Chuang (TW)

(73) Assignee: Partner Tech Corp., Taipei (TW)

( * ) Notice: Subject to any disclaimer, the term of this patent is extended or adjusted under 35 U.S.C. 154(b) by 510 days.

(21) Appl. No.: 10/683,700

(22) Filed: Oct. 14, 2003

(65) Prior Publication Data

US 2005/0079899 A1    Apr. 14, 2005

(51) Int. Cl.
*H04M 1/00*    (2006.01)
(52) U.S. Cl. ............... 455/569.1; 379/102.01; 379/102.03; 455/41.2; 455/557
(58) Field of Classification Search ........ 455/41.2, 455/569.1, 557, 550.1, 575.1; 379/102.01, 379/102.03; 381/330; 607/57
See application file for complete search history.

(56) References Cited

U.S. PATENT DOCUMENTS 5,824,022 A * 10/1998 Zilberman et al. ........... 607/57
6,021,207 A * 2/2000 Puthuff et al. ............... 381/330
6,438,245 B1 * 8/2002 Taenzer et al. .............. 381/330
6,560,468 B1 * 5/2003 Boesen ...................... 455/569.1
2004/0136555 A1 * 7/2004 Enzmann .................... 381/314

\* cited by examiner

*Primary Examiner*—Matthew D. Anderson
*Assistant Examiner*—Sanh Phu
(74) *Attorney, Agent, or Firm*—Rosenberg, Klein & Lee

(57) ABSTRACT

A wireless earphone with a built-in mobile communications module and a dial-up method of the same are proposed. The mobile communications module is used to automatically answer an incoming call. A wireless electronic dial-up device is used for dial-up communications. The wireless earphone comprises a mobile communications module, a digital signal processor, an earphone, a microphone and a wireless communications module. The mobile communications module is used to receive a first remote signal and emit a first reply modulation signal. The digital signal processor is connected to the mobile communications module and used for processing digital signals. The earphone is connected to the digital signal processor. The microphone is connected to the digital signal processor. The wireless communications module is also connected to the digital signal processor, and is used to receive a second remote signal and emit a second reply modulation signal.

9 Claims, 3 Drawing Sheets

WIRELESS EARPHONE WITH BUILT-IN MOBILE COMMUNICATIONS MODULE AND DIAL-UP METHOD OF THE SAME

FIELD OF THE INVENTION

The present invention relates to a wireless earphone with a built-in mobile communications module and a dial-up method of the same and, more particularly, to a wireless earphone and a dial-up method of the same, which can make use of the communications protocol of personal handyphone system (PHS) to answer an incoming call.

BACKGROUND OF THE INVENTION

The Bluetooth technology is a low-cost, low-power and short-distance wireless communications technology, and can be widely applied to any personal mobile communications equipment. Making use of the function of wireless transmission, Bluetooth wireless earphones, portable mobile phone watches, and communication devices directly worn on a finger can be designed. These products not only can accomplish wireless transmission, but also can provide the functions of being online and sending and receiving e-mails.

There are various commercial Bluetooth earphones. They are generally matched with Bluetooth mobile phones in application. Through the Bluetooth communications technology, incoming voice messages of a Bluetooth mobile phone can be wirelessly transmitted to a Bluetooth wireless earphone, and voice messages to be transferred can also be wirelessly transmitted to the Bluetooth mobile phone for emission of messages via the Bluetooth wireless earphone, thereby accomplishing full-duplex communications. However, a Bluetooth wireless earphone needs to match a Bluetooth mobile phone to accomplish voice communications, but can't receive incoming voice messages by itself.

SUMMARY OF THE INVENTION

One object of the present invention is to provide a wireless earphone with a built-in mobile communications module and a dial-up method of the same, wherein the built-in mobile communications module can receive incoming voice messages by itself to accomplish full-duplex communications.

The present invention provides a wireless earphone with a built-in mobile communications module and a dial-up method of the same. The mobile communications module is so small that it can be built in the wireless earphone for transmission or reception of voice messages. A digital signal processor (DSP) is used to process and control the transmission direction of voice messages. Incoming voice messages are processed by a voice transmission and encoding/decoding unit and then outputted via an earphone. A microphone is used to receive voice messages to be transferred, which are sent to the voice transmission and encoding/decoding unit and then processed by the DSP to control the transmission direction of voice messages and finally emitted out via the mobile communications module.

The present invention can make use of a wireless electronic dial-up device for dial up. A wireless communications module in the wireless earphone is used to receive a dial-up signal, which is then processed by the DSP to accomplish full-duplex communications through the built-in mobile communications module.

The various objects and advantages of the present invention will be more readily understood from the following detailed description when read in conjunction with the appended drawings, in which:

DETAILED DESCRIPTION OF THE PREFERRED EMBODIMENTS

Figure 1:
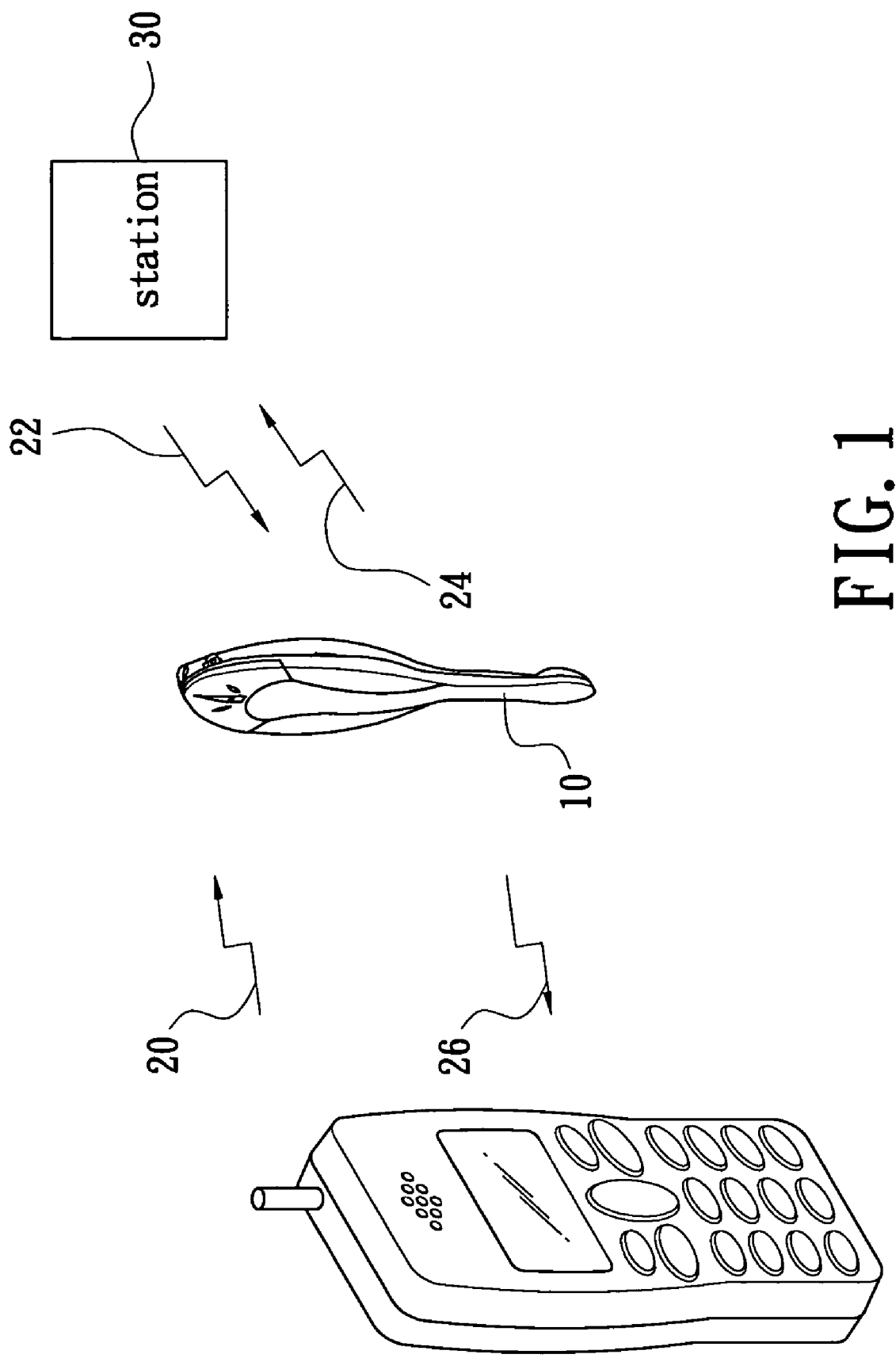
FIG. 1 is a communications architecture diagram for transceiving incoming signals of the present invention.

As shown in FIG. 1, a wireless earphone 10 with a built-in mobile communications module can receive signals from a station 30 and send signals to the station 30, and can also send and receive messages to and from a wireless electronic dial-up device.

Figure 2:
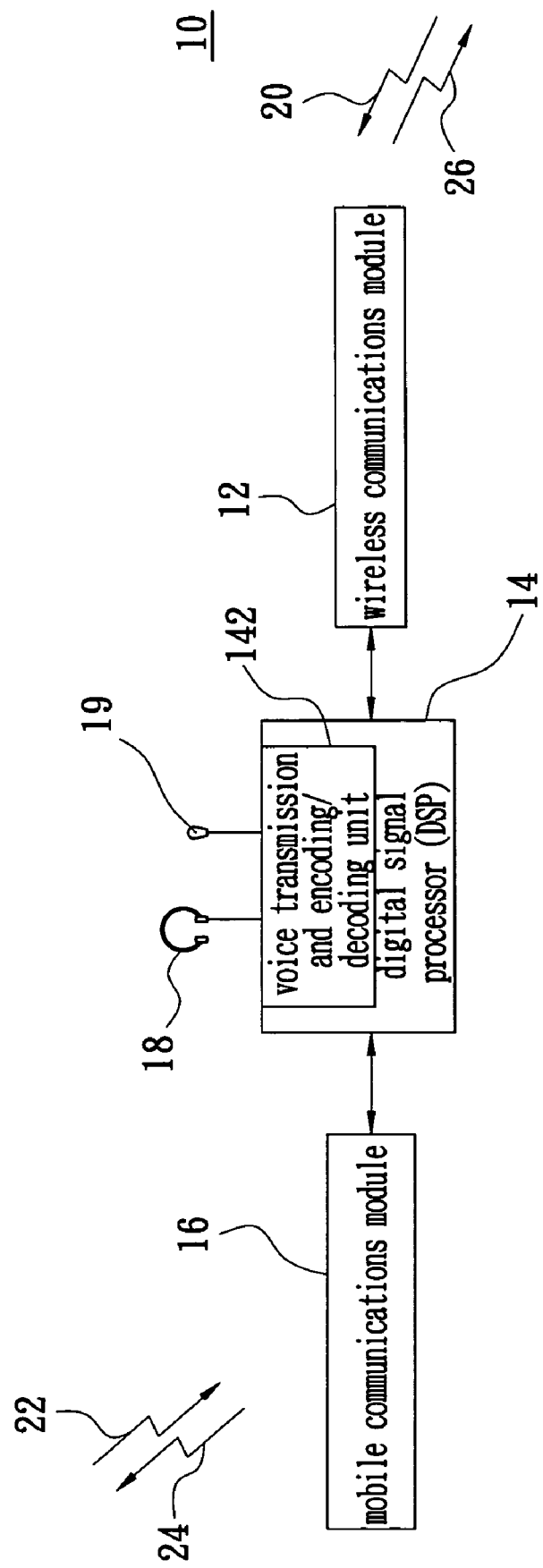
FIG. 2 is a circuit block diagram of a wireless earphone with a built-in mobile communications module of the present invention.

As shown in FIG. 2, the wireless earphone 10 with a built-in mobile communications module can receive incoming voice messages by itself through the mobile communications module to accomplish full-duplex communications. The wireless earphone 10 with a built-in mobile communications module comprises a mobile communications module 16, a digital signal processor (DSP) 14, an earphone 18, a microphone 19 and a wireless communications module 12.

Please refer to FIG. 2. The mobile communications module 16 is connected to the DSP 14 to receive a first remote signal 22 and emit a first reply modulation signal 24.

When there is an incoming call, the mobile communications module 16 will receive the first remote signal 22 and send it to the DSP 14 for processing. After decoded by a voice transmission and encoding/decoding unit 142 in the DSP 14, the signal will be send out via the earphone 18 to be heard by the user.

As shown in FIG. 2, if the user wants to reply to the incoming call, the reply signal is transferred into the voice transmission and encoding/decoding unit 142 in the DSP 14 via the microphone 19. After encoded by the voice transmission and encoding/decoding unit 142, the reply signal will be transferred to the mobile communications module 16, which will then emit the first reply modulation signal 24 to a remote station 30 shown in FIG. 1.

The wireless earphone 10 with a built-in mobile communications module of the present invention can thus accomplish full-duplex voice communications. The above mobile communications module 16 can be a personal handyphone system (PHS) module or a code division multiple access (CDMA) module.

Please refer to FIG. 2 again. The wireless earphone 10 with a built-in mobile communications module can make use of the wireless communications module 12 therein to accomplish full-duplex communications with an external wireless communications device.

When there is an incoming call, the wireless communications device will receive the incoming call and wirelessly send to the wireless communications module 12. After processed by the DSP 14 and decoded by the voice transmission and encoding/decoding unit in the DSP 14, the incoming call will be sent out via the earphone to be heard by the user.

As shown in FIG. 2, if the user wants to reply to the incoming call, the reply signal is transferred into the voice transmission and encoding/decoding unit 142 in the DSP 14 via the microphone 19. After encoded by the voice transmission and encoding/decoding unit 142, the reply signal will be transferred to the wireless communications module 12, and a second reply modulation signal 26 will be obtained. The second reply modulation signal 26 is wirelessly transferred to the external wireless communications device via the wireless communications module 12 to accomplish full-duplex voice communications. The above wireless communications module 12 can be a Bluetooth communications module, and the wireless communications device can be a Bluetooth mobile phone or a Bluetooth personal digital assistant (PDA).

Figure 3:
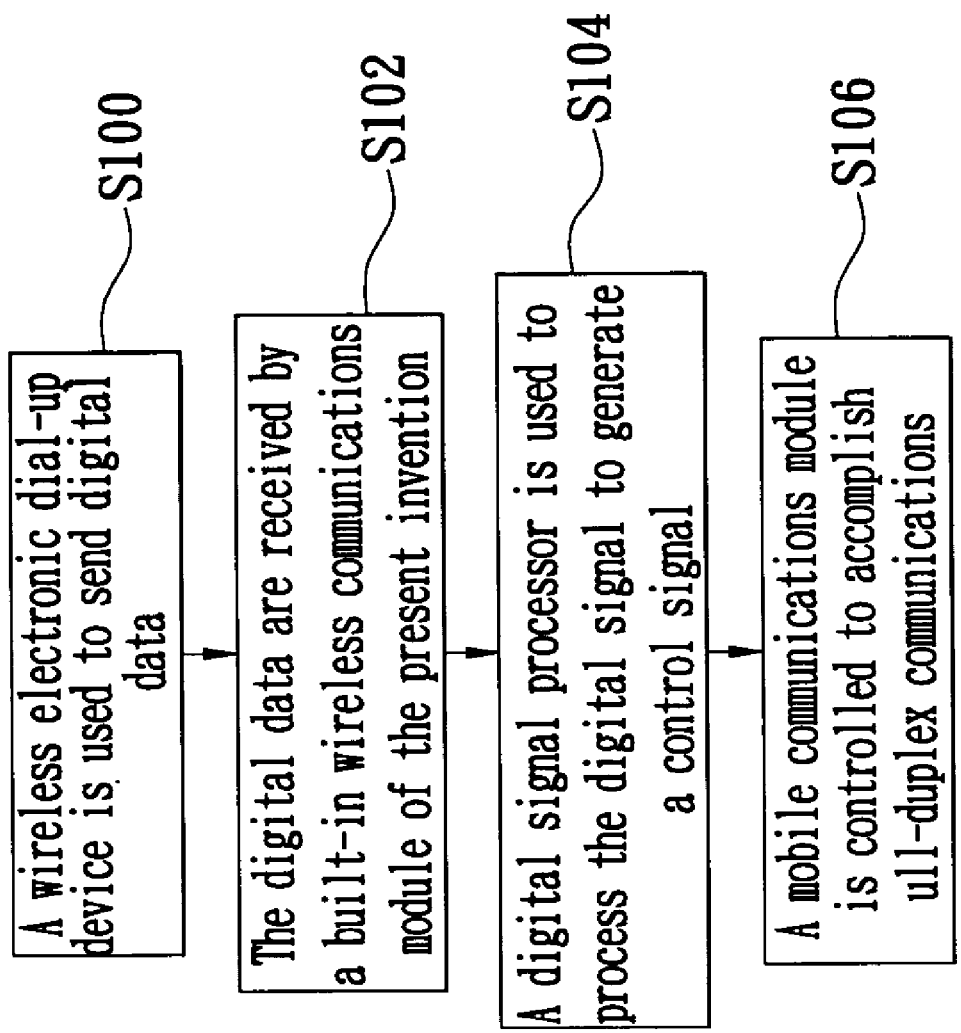
FIG. 3 is an operation flowchart of a dial-up method of the present invention.

As shown in FIG. 3, the operation flowchart of a dial-up method of the wireless earphone with a built-in mobile communications module of the present invention comprises the following steps. First, a wireless electronic dial-up device is used to send digital data (S100). The digital data are then received by a built-in wireless communications module of the present invention to generate a digital signal (S102). Next, a DSP is used to process the digital signal to generate a control signal (S104). Finally, a mobile communications module is controlled to accomplish full-duplex communications (S106).

As shown in FIG. 2, in the flowchart of the present invention, a wireless electronic dial-up device is used to wirelessly send a second remote signal 20 to the wireless communications module 12. The wireless communications module 12 receives the second remote signal 20 and generates a digital signal. After the digital signal is processed by the DSP, a control signal is outputted. The control signal controls the mobile communications 16 to emit a call signal to the opposite side. Until the opposite side answers the call, full-duplex voice communications can then be accomplished with the earphone and the microphone.

To sum up, a wireless earphone with a built-in mobile communications module and a dial-up method of the same can make use of the mobile communications module accomplish the function of answering an incoming call by itself without the need of a wireless mobile phone. When one wants to call another person, a wireless electronic dial-up device (e.g., a wireless mobile phone, a wireless keyboard, a wireless indoor telephone and so on) can be used to accomplish full-duplex communications.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A wireless earphone with a built-in mobile communications module, comprising:
    a mobile communications module used to receive a first remote signal and emit a first reply modulation signal;
    a digital signal processor connected to said mobile communications module and used for processing digital signals;
    an earphone connected to said digital signal processor;
    a microphone connected to said digital signal processor; and
    a wireless communications module also connected to said digital signal processor and used to receive a second remote signal and emit a second reply modulation signal.

2. The wireless earphone with a built-in mobile communications module as claimed in claim 1, wherein said first remote signal is generated by a station.

3. The wireless earphone with a built-in mobile communications module as claimed in claim 1, wherein said second remote signal is generated by a wireless electronic dial-up device.

4. The wireless earphone with a built-in mobile communications module as claimed in claim 3, wherein said wireless electronic dial-up device can be a Bluetooth mobile phone.

5. The wireless earphone with a built-in mobile communications module as claimed in claim 3, wherein said wireless electronic dial-up device can be a personal digital assistant.

6. The wireless earphone with a built-in mobile communications module as claimed in claim 1, wherein said mobile communications module can be a personal handyphone system module.

7. The wireless earphone with a built-in mobile communications module as claimed in claim 1, wherein said mobile communications module can be a code division multiple access module.

8. The wireless earphone with a built-in mobile communications module as claimed in claim 1, wherein said digital signal processor comprises a voice transmission and encoding/decoding unit for encoding and decoding of voice and conversion between digital data and analog data.

9. The wireless earphone with a built-in mobile communications module as claimed in claim 1, wherein said wireless communications module is a Bluetooth communications module.

* * * * *